Jan. 9, 1934. A. T. KENNEDY 1,942,604
CAMERA LEVELING AND SHUTTER CONTROLLING APPARATUS
Filed Aug. 24, 1932  3 Sheets-Sheet 1
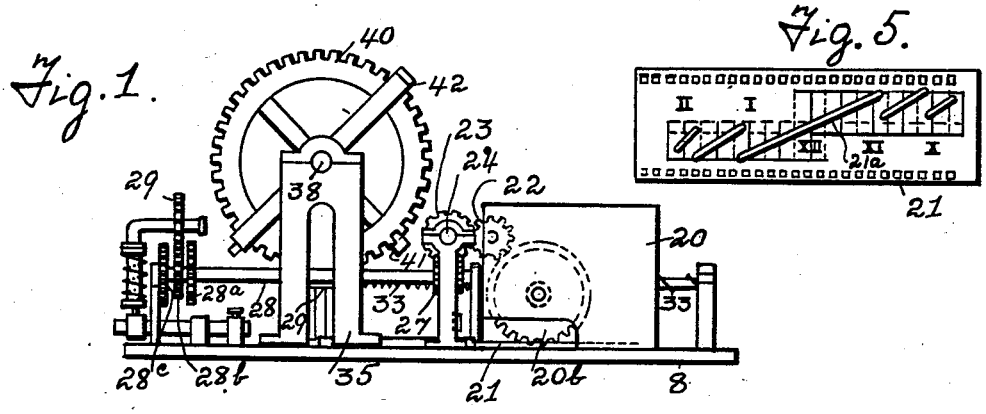
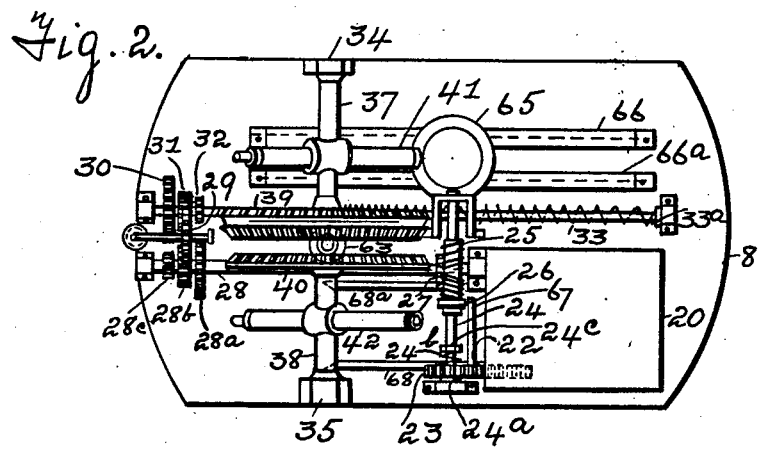
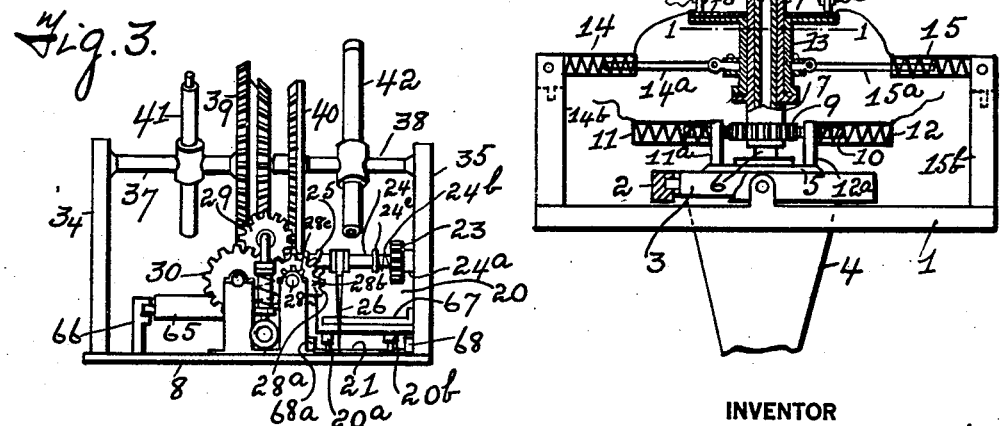
INVENTOR
Arthur T. Kennedy
BY James F. Watson
ATTORNEY

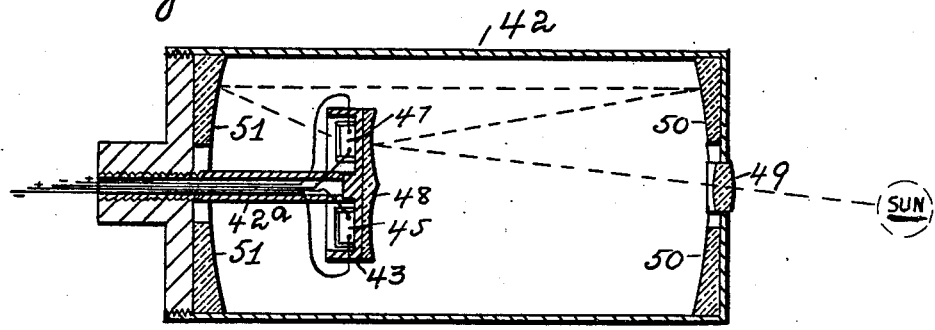
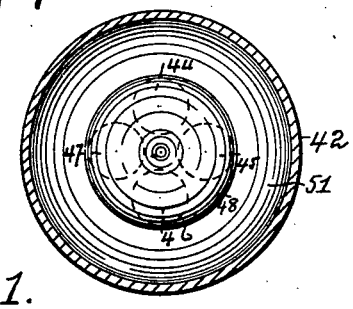
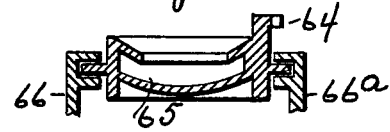
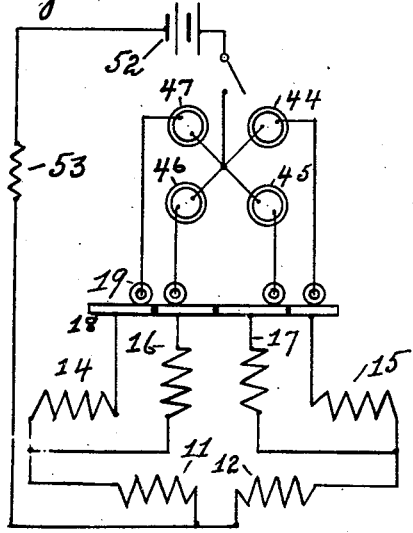
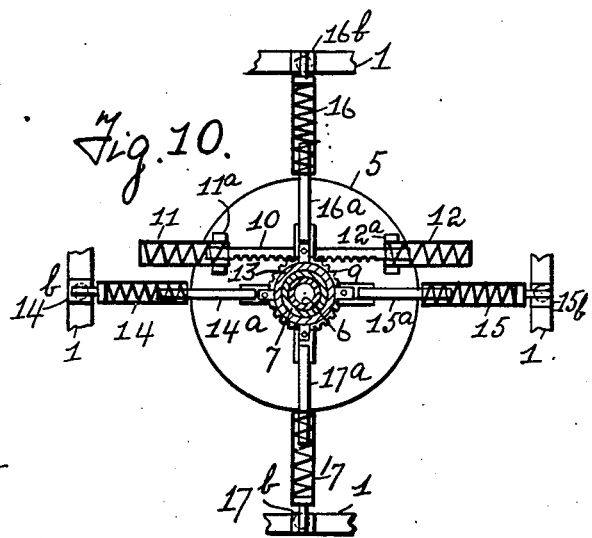

Jan. 9, 1934.  A. T. KENNEDY  1,942,604
CAMERA LEVELING AND SHUTTER CONTROLLING APPARATUS
Filed Aug. 24, 1932  3 Sheets-Sheet 3
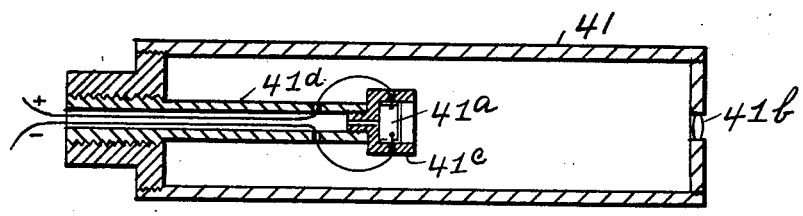
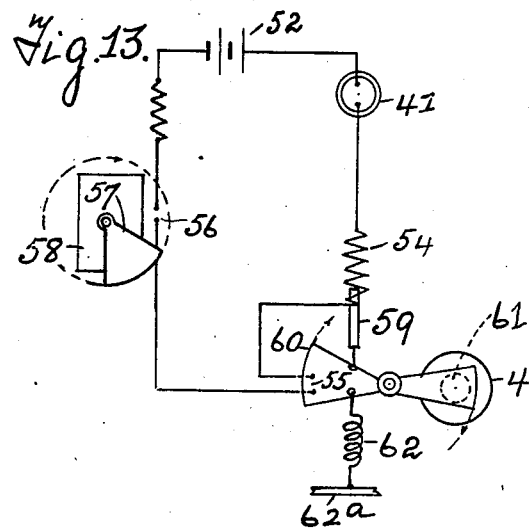
INVENTOR
Arthur T. Kennedy
BY James T. Watson
ATTORNEY Patented Jan. 9, 1934

1,942,604

UNITED STATES PATENT OFFICE 1,942,604

CAMERA LEVELING AND SHUTTER CONTROLLING APPARATUS

Arthur T. Kennedy, Duluth, Minn.

Application August 24, 1932. Serial No. 630,204

7 Claims. (Cl. 88—16)

My invention relates to leveling and shutter controlling apparatus and has for its object the provision of means for leveling a photographic camera and controlling the shutter thereof, and for such other purposes as it may be adapted to serve. Heretofore, the irregular tilting, yawing, or dipping of an aeroplane in flight has made it exceedingly difficult to level a camera carried thereby for the purpose of taking a series of overlapping pictures of the ground at the same, or approximately the same angle and at approximately regular intervals of time, so that they may be conveniently trimmed and pasted together in a strip showing a substantially continuous view. My invention is designed to reduce or obviate such difficulty, and consists of the constructions, combinations and arrangements of parts hereinafter described and claimed.

In the drawings, Fig. 1 is a side elevation of the superstructure of my invention. Fig. 2 is a top plan view of said superstructure. Fig. 3 is a rear end elevation of said superstructure. Fig. 4 is a central vertical section of the basic structure forming part of said invention. Fig. 5 is a top plan view of a flight card forming part of said invention. Fig. 6 is a central vertical longitudinal section of an upwardly directed cell tube embodied in said invention. Fig. 7 is a central transverse section through said tube. Fig. 8 is a central vertical transverse section through a mirror, or artificial horizon basin and guide rails therefor. Fig. 9 is a central transverse section through a photo-electric cell, as, for example, the cell 41$^a$. Fig. 10 is a horizontal section of said base structure on the line 1—1 of Fig. 4. Fig. 11 is a wiring diagram. Fig. 12 is a central longitudinal section through a second or downwardly directed cell tube. Fig. 13 is a wiring diagram including the cell in said second tube.

In the drawings, 1 is a relatively stationary frame or bracket of any suitable form or structure, preferably adapted to be secured to an aeroplane, or dirigible balloon, or other unstable support. Within, or upon said frame are mounted concentric gimbal rings 2 and 3, respectively, and secured to and depending from the interior one of said rings is a photographic camera 4, of any suitable construction. Mounted upon said ring 3 is a foot plate 5, upon which is erected a preferably hollow post 6, upon the upper end of which post is mounted a loose sleeve 7, carrying a head plate 8. Secured to said sleeve is a gear 9, adapted to engage a reciprocatable rack bar 10, which forms, or is attached to the armatures of oppositely disposed solenoids 11 and 12, which are supported in any suitable manner as by standards 11$^a$ and 12$^a$, respectively, erected upon said foot plate. Mounted loosely upon said sleeve is a collar 13, to which are pivotally connected the converging ends of a plurality of radially disposed armatures as preferably 14$^a$, 15$^a$, 16$^a$ and 17$^a$ for corresponding radially disposed solenoids 14, 15, 16 and 17, respectively, which are pivotally secured to respectively corresponding anchorages or posts erected on said frame or bracket, as to the posts 14$^b$, 15$^b$, 16$^b$ and 17$^b$, respectively.

Upon the upper end of said collar, is mounted a contact plate 18, embodying preferably four equal radial contact segments insulated from each other and from said collar.

Suspended in any suitable manner or by any suitable means from said head plate and insulated therefrom are four contact shoes or wheels, as 19, adapted to bear upon said contact segments respectively.

Upon said head plate is mounted a clock work mechanism 20 of any suitable structure, provided with gears 20$^a$, 20$^b$, for driving a flight card 21, of any suitable material or structure, at a regular predetermined speed. Said clock mechanism is also provided with a gear 22 adapted to drive a gear 23 splined on the shaft 24 and held against a collar 24$^a$ by a spring 24$^b$ positioned between said gear and the collar 24$^c$. Said gear 23 is adapted to turn the shaft 24 of a differential, or variable pitch worm 25 splined on said shaft. The thread on said worm is preferably of the knife-edge type and the forward half is pitched in a forward-driving direction and the rearward half is pitched in a reverse driving direction. Said rearward half of said thread is preferably spaced from said forward half a short distance. Each half of the thread is of variable pitch and their slowest driving ends are adjacent to each other.

Journalled on the hub of said worm is a depending lever 26, adapted to engage one or another of the guide paths 21$^a$ in said card, whereby said lever is forced to move said worm 25 in its path of travel longitudinally of its supporting shaft.

Said card is designed to move in the direction of said clock mechanism. The Roman numerals on said card indicate hours. The apertures adjacent the margins of said card are for the engagement of the gears 20$^a$ and 20$^b$.

Said worm 25 engages a worm wheel or gear 27 keyed to a drive shaft 28 whereon is keyed a set of differential gears as 28ª, 28ᵇ, 28ᶜ, of any suitable number and structure adapted to be operatively coupled by an intermediate or idler gear 29 with transversely registering gears as 30, 31, and 32, respectively, which are keyed to a worm 33 extending parallel to said drive shaft 28.

Erected upon said head plate are also posts of any suitable structure 34 and 35 upon which are journalled shafts 37 and 38, respectively, upon which shafts are fixed driving gears 39 and 40, respectively, and cell tubes 41 and 42, respectively.

Within said tube 42, is a photo-electric or selenium cell box 43 preferably positioned near the rear end of the tube, centrally thereof and open toward the rear, which box contains a chamber or chambers for one or more, preferably four, photo-electric cells as 44, 45, 46 and 47, mounted, respectively, in frames or holders of any suitable construction, and material, preferably of transparent glass. Said cells are inserted in corresponding electric circuits, as hereinafter more particularly described.

Forward of said cell box and preferably mounted thereon is a parabolic mirror, as 48, exposed to any beams of light which may enter the tube through a window or object lens 49 centrally positioned in the front wall of said tube. Within said tube, preferably near the front thereof, is a parabolic mirror 50 faced toward the rear and adapted to receive the reflected beams of light from said mirror 48. Within said tube, at or near the rear end thereof is a parabolic mirror 51 faced toward the front and adapted to receive the beams of light reflected from said mirror 50, and to reflect said beams upon one or another of said photo-electric cells to weaken the electric resistance thereof and thereby close the circuit of the cell affected.

Each of said cells is embodied in a different electric circuit comprising any suitable source of electricity, as the battery 52, one or another of said solenoids 14, 15, 16, or 17, respectively, and one or the other of said solenoids 11 or 12. Each of said circuits may also embody any suitable resistance as 53, to compensate for any effect of diffused light on said photo-electric cells, or such resistance may be omitted.

The circuit wires to and from said cells, respectively, preferably lead in and out of said tube 42 through the bore of a hollow post 42ª mounted in said tube.

Thus, when intense light, as of a direct sunbeam enters the tube at any angle through the object lens, it strikes the mirror 48 and is reflected forward to some part of the mirror 50 and thence back to some part of the mirror 51 and thence forward to one or another of said cells, closing the circuit in which said lighted cell is included. The solenoids embodied in said circuit are thereupon energized and operate to rotate and tilt the invention until the light beam becomes central, at which time the invention and attached camera will be substantially level and the operative light beam will be neutral to all of said cells.

One of said tubes 41 or 42 is normally pointed above the natural horizon and directly at the sun, and the other of said tubes is normally pointed below the natural horizon and at the center of an artificial horizon, as will be hereinafter explained. Preferably, said tube 42 is pointed at the sun.

Within said tube 41 is a single photo-electric cell, 41ª, of any suitable structure or material preferably concentric with the longitudinal axis of said tube and preferably near the rear end thereof. Said cell is exposed to any direct beam of light admitted by a window or lense 41ᵇ in the front wall of said tube. Said cell 41ª is preferably supported by a cell box 41ᶜ of any suitable structure positioned on the end of a hollow post 41ᵈ which extends through the rear wall of said tube 41. Said cell 41ª is embodied in a separate electric circuit comprising said source of electricity, said cell 41ª, an electromagnet or solenoid 54, a normally closed switch 55, and a normally open switch 56. Said switch 56 may comprise a contactor of any suitable structure as a rotary segment 57 which may be driven at any desired speed by any suitable clock type mechanism 58 whereby said switch will be closed and opened intermittently at any desired intervals.

An armature 59 of any suitable structure is provided for said magnet or solenoid 54 and is attached to the trigger 60 of a camera shutter of any suitable structure, whereby the armature 59 is adapted in operation to actuate said trigger and shutter to uncover the lens 61 of said camera. A spring 62 is attached at one end to said trigger to retract the same and thus close said switch 55 after the armature 59 has been released by its solenoid coil. The opposite end of said spring may be attached to any suitable relatively stationary anchorage 62ª. When said trigger is operated by said armature, it is also adapted to open said normally closed switch 55, thus opening the circuit of said solenoid 54 and causing it to release its armature. In the meantime the mechanism 58 will drive the contactor segment 57 out of circuit closing contact with the switch 56, thus temporarily opening the circuit at that point.

The worm 33 is adapted to engage said gear 39. Said gear 39 is preferably double faced and is adapted to engage a transmission idler 63 positioned between the gears 39 and 40, which idler also engages said gear 40 and is adapted to turn said gear 40 in the opposite direction to the rotation of the gear 39.

The worm 33 is also adapted to engage a finger 64, or mechanical equivalent, extending from an artificial horizon basin 65, which is preferably filled with mercury, and is adapted to slide on guide rails 66 and 66ª. The basin is preferably partly covered by an annular dished flange to prevent said mercury from spilling if the device is tilted or even overturned.

Said mercury forms an artificial horizon at the center of which said tube 41 is pointed, and when sunlight is reflected from said artificial horizon into said tube 41 and focused upon said cell 41ª, it will weaken the resistance or increase the conductivity of said cell 41ª and permit the flow of adequate electric current therethrough to operate said solenoid 54, provided the switches 55 and 56 are both closed at the time. It should be observed, however, that because of vibration, or of the tipping or dipping of the aeroplane, the mercury will probably be much of the time in such turbulent condition that it will only intermittently reflect a ray at the right angle to sufficiently affect the cell 41ª. Thus the solenoid 54 will not be energized too frequently, or for an excessive period at any time.

The worm 33 is of variable pitch, the thread becoming gradually faster from a point preferably adjacent to the idler 63 to the forward end of said worm as at 33ª, whereby said artificial horizon may be moved along its path at a gradually slowing pace rearwardly from the front end of said worm between sunrise and noon and at a gradually increasing speed toward the front of said worm when the rotation of the worm is reversed between noon and sunset.

In operation, before commencing a flight, the operator calculates the angle of the sun's position with reference to the place and time that the flight will be commenced, and the subsequent apparent course of the sun during the proposed flight, making due allowance for the elevation, course and speed of the plane, and plats said course on the flight card by forming paths in said card. He then adjusts said worm 25 to the proper position for engagement with the gear 27; position depending on the result of said calculations. Said adjustment may be effected by temporarily disengaging said gear 23 from the gear 22 by pushing said gear 23 along its shaft in opposition to the spring 24$^b$, and by then rotating said gear 23 manually the required distance in one direction or the other. The operator may then disengage the idler 29 from the adjacent transmission gears, and spin the worm 33 in one direction or the other until the artificial horizon is at the proper point in its path at which time the tube 42 will be elevated at the proper angle to point to the sun, and the tube 41 will point to the artificial horizon. The operator then re-engages the idler 29 with one or another pair of the adjacent transmission gears; places the flight card on its path and engages it with said gears 20$^a$ and 20$^b$, and rotates and levels the invention so that the tube 42 will point at the sun. The invention will then be in operative position and should operate automatically during the flight, except that the operator during flight will change the gear between the shaft 28—and the worm 33—from high to intermediate and to low during the morning and from low to intermediate and to high in the afternoon, and when the lever 26 has reached the lower end of any of the guide paths in said flight card, it will be lifted out by the operator and will be set in the upper end of the next following path. A stationary bar 67 is positioned against the forward side of the lever 26 to prevent the forwardly moving card 21 from dragging the free end of the lever forwardly. Guide rails 68, 68$^a$ are preferably provided for said card. On said card I also preferably exhibit memoranda (not shown) of the place, date, latitude and longitude of the flight and such other matter as may be desired for record.

If desired, a vernier (not shown) scale may be marked on one or the other of said gears 39 or 40, or a separate vernier may be provided for the convenience of the operator in determining the angles of the cell tubes in the operation of adjusting the invention for a flight.

A horizontal angle scale (not shown) of any suitable construction is also preferably marked or mounted on said invention in any suitable manner and at any convenient location.

Spirit level glasses, (not shown) may, if desired, be mounted at any suitable place or places on said invention to facilitate temporary leveling of the same by the operator during the adjustment of the invention before flight, or at any other time if necessary.

It is obvious that my invention may be modified in various particulars within the spirit and scope of my claims.

What I claim is—

1. The combination with a relatively stationary frame having gimbal rings mounted thereon and a photographic camera depending from the interior one of said rings, of a foot plate mounted on said interior ring; a post erected on said foot plate; a rotatable sleeve mounted on said post; a head plate on said sleeve; a gear on said sleeve and adapted to turn the same; a rack engaging said gear; oppositely disposed solenoids supported on said foot plate for reciprocating said rack; a collar loosely mounted on said sleeve; a group of radially disposed solenoid coils and a group of armatures therefor, one of said groups being connected to said collar and the other of said groups being connected to posts erected on said frame; an upwardly-inclined tube pivotally mounted on said head plate, said tube having a window in its upper end; a plurality of electric circuits, each including a source of electricity, a different one of a plurality of photo-electric cells positioned in said tube and one of said coils; mirrors in said tube for reflecting to said cells at various times, respectively, light entering said tube through said window; a downwardly inclined tube pivotally mounted on said head plate, said tube having a window in its lower end; a photo-electric cell in the downwardly inclined tube adapted to receive light entering said tube through said window; a lens shutter and shutter trigger for said camera; a normally open electric circuit comprising a source of electricity, the cell in said downwardly turned tube, a solenoid coil, a normally closed switch adapted to be opened by said solenoid, and a normally open switch; an armature for said coil, one end of said armature being connected to said trigger; a movable contactor for said normally open switch; a clock type mechanism for operating said contactor to close and open said normally open switch at regular predetermined intervals; a spring attached to said trigger for retracting the same; a reciprocable artificial horizon mounted on said head plate and adapted to be reciprocated in a path parallel thereto and extending longitudinally thereof in a plane perpendicular to the longitudinal axis of said downwardly directed tube; a prime mover mounted on said head plate; transmission means adapted to be driven by said prime mover and to alter the angle of elevation and of depression of said tubes, respectively, and to reciprocate said artificial horizon; and means actuated by said prime mover for gradually decreasing the speed of a portion of said transmission mechanism for a predetermined period and for gradually increasing the speed of said portion for a succeeding predetermined period, whereby the angles of elevation and depression of said tubes, respectively, are changed at predetermined variable speeds and whereby said artificial horizon is kept in line with the window and cell in said downwardly inclined tube.

2. The combination with a relatively stationary frame having gimbal rings mounted thereon, of a foot plate mounted on the interior one of said plates; a post erected on said plate; a rotatable sleeve mounted on said post; a head plate mounted on said sleeve; a gear on said sleeve and adapted to rotate the same; a reciprocable rack engaging said gear; oppositely disposed solenoids mounted on said foot plate and adapted to reciprocate said rack; a collar loosely mounted on said sleeve; a group of radially disposed solenoid coils and a group of armatures therefor, one of said groups being connected to said collar and the other of said groups being connected with posts erected on said frame; an upwardly inclined tube pivotally mounted on said head plate, said tube having a window in its front end; a plurality of photo-electric cells within said tube; mirrors within said tube for reflecting to said cells at various times, respectively, light entering said tube through said window; a prime mover mounted on said head plate; transmission means adapted to be driven by said prime mover and to change the angle of elevation of said tube; means actuated by said prime mover and adapted to gradually reduce the speed of said transmission means for a predetermined period and to successively increase the speed of said transmission means for another predetermined period; and a plurality of electric circuits, each of said circuits comprising a source of electricity, one of said cells, respectively, one of said group of coils, respectively, and one of said oppositely disposed solenoids which is also included in one only of the others of said circuits.

3. The combination with a relatively stationary frame having gimbal rings mounted thereon, of a foot plate mounted upon the interior one of said rings; a post erected upon said foot plate; a sleeve mounted upon said post; a head plate on said sleeve; a loose collar upon said sleeve; a group of radially disposed electromagnetic coils and a group of armatures therefor, one of said groups being connected to relatively stationary anchorages on said frame, the other of said groups being connected to said collar; a tube pivotally mounted on said head plate, said tube having a window in one end; a plurality of photo-electric cells within said tube; mirrors within said tube for reflecting to said cells at various times, respectively, light entering said tube through said window at correspondingly various angles; means for automatically moving said tube on its pivot; and a plurality of electric circuits, each including a source of electricity, one of said cells and one of said coils.

4. The combination with a relatively stationary frame having gimbal rings mounted thereon, of a foot plate mounted on the interior one of said rings; a post erected on said foot plate; a sleeve mounted on said post; a head plate mounted on said sleeve; a loose collar on said sleeve; a group of radially disposed solenoid coils and a group of armatures therefor, one of said groups being connected to relatively stationary anchorages on said frame and the other of said groups being connected to said collar; a tube pivotally mounted on said head plate, said tube having a window in one end; a plurality of photo-electric cells in said tube; mirrors within said tube for reflecting to said cells at various times, respectively, light entering said tube through said window at respectively various angles; a prime mover on said head plate; variable speed transmission mechanism adapted to be driven by said prime mover and to automatically move said tube on its pivot; means for governing the variation of speed in said transmission mechanism, said governing means including a flight card adapted to be engaged and moved by means driven by said prime mover, said flight card having guide paths formed therein conforming to predetermined periods of time, and a lever journalled at one end on a reciprocable member of said transmission mechanism and adapted at the opposite end to extend into one of said guide paths, whereby said lever is actuated by the walls of said guide path as the card is moved by said card driving means; and a plurality of electric circuits each including a source of electricity, one of said cells and one of said coils.

5. The combination with a photographic camera shutter and trigger therefor, of a tube having a window in one end; a normally open electric circuit comprising a source of electricity, a photo-electric cell within said tube, a solenoid coil, a normally closed switch including said trigger, a normally open switch and a circuit closer for said normally open switch; an armature for said coil, said armature being connected to said trigger to operate the same and open said normally closed switch; a spring for retracting said trigger to close said normally closed switch, and a clock-type mechanism for operating said circuit closer to close said normally open switch at predetermined intervals.

6. The combination with a relatively stationary frame and gimbal rings mounted thereon, of a tube; intermediate means for supporting said tube on one of said rings; a group of radially disposed solenoid coils; a group of armatures therefor, one of said groups being connected to said intermediate means and the other of said groups being connected to said frame; a plurality of photo-electric cells within said tube, said cells and coils being included in a plurality of electric circuits, each of which circuits includes a source of electricity, one only of said cells and one only of said coils.

7. The combination with a relatively stationary frame having gimbal rings mounted thereon and a photographic camera depending from the interior one of said rings, of a tube supported by said interior ring; a plurality of photo-electric cells within said tube, and electromagnetic means including said cells for leveling said rings and camera.

ARTHUR T. KENNEDY.